Patented Jan. 6, 1925.

1,521,829

UNITED STATES PATENT OFFICE.

WILLIAM B. NEWKIRK, OF RIVERSIDE, ILLINOIS, ASSIGNOR, BY MESNE ASSIGNMENTS, TO INTERNATIONAL PATENTS DEVELOPMENT COMPANY, A CORPORATION OF DELAWARE.

ANHYDROUS GRAPE SUGAR.

No Drawing.     Application filed September 21, 1923. Serial No. 664,077.

*To all whom it may concern:*

Be it known that I, WILLIAM B. NEWKIRK, a citizen of the United States, residing at Riverside, in the county of Cook and State of Illinois, have invented certain new and useful Improvements in Anhydrous Grape Sugar, of which the following is a specification.

My invention relates to the manufacture of grape sugar or dextrose from starch, or starch bearing materials, more especially from corn starch, and its object is the production of an anhydrous crystalline pulverulent or granular grape sugar of high purity, permanent whiteness, and without the bitter taste characteristic of grape sugars heretofore produced by the conversion of starch.

The preferred method by which the product of the present invention is manufactured is described in my copending application entitled method of making grape sugar filed May 28, 1923, Serial No. 641,886, and was originally disclosed in an application entitled method of making grape sugar filed November 16, 1922, Serial No. 601,302, (patented as No. 1,471,347, October 23, 1923) of which application 641,886 is a division.

Efforts have been made extending over a long period of time to produce from starch, particularly corn starch, an anhydrous crystalline grape sugar, with the impurities of the starch conversion substantially eliminated, that is, reduced to a minimum affecting neither whiteness nor taste of the product; but such efforts have not been completely successful. The best sugars have contained enough impurities to produce a certain bitter taste and to give the products some coloration which, although absent at first, will often appear after an elapse of time. This failure of previous experimenters to produce a completely satisfactory, that is to say, a substantially pure corn sugar, has been due it is believed, to a lack of appreciation of the conditions necessary in order that, after crystallization has taken place, the mother liquor (uncrystallized dextrose, dextrine and impurities of a protein and mineral character) may be completely or substantially completely, extracted and separated from the dextrose crystals.

The methods heretofore employed with greatest measure of success have involved crystallizing the dextrose solution into blocks or cakes, removing the mother liquor from the blocks by pressing or centrifuging and then drying the blocks and pulverizing them. Complete removal of the impurities cannot be effected in this manner, besides which the pulverizing of the block sugar presents some difficulties. I proceed in a quite different way: After the crystals have been formed in the solution, the magma of mother liquor and crystals is certrifuged to spin out the mother liquor. The problem has been to obtain a magma in which the crystals will be of relatively uniform size and normal crystalline form for the type of dextrose manufactured; that is, a magma in which the crystals are in the form of prisms of substantial thickness both ways in comparison with their length. If "false grain", that is small or deformed flake-like or needle-like crystals, is allowed to form, the magma cannot be successfully purged. The flakes and needles will break down and the minute particles will fill the voids between the normal crystals so as to prevent the mother liquor from being spun out of the mass, or at least as completely as is necessary in order to obtain a high purity product. In order that a properly purgable magma should be produced, the following conditions are necessary: (1) The solution must be treated with anhydrous crystals to the substantial exclusion of the hydrate; (2) it must be continuously agitated so as to keep the seed and induced crystals in suspension and evenly distributed throughout the solution; (3) the temperature at which crystallization takes place should be within what may be termed the anhydrous range, that is, it should be at a temperature favorable to the induction of anhydrous crystals and not at a temperature which favors the formation of the hydrate. The optimum temperature will depend upon the density of the solution and also upon its purity.

Specifically, according to the method preferably employed to obtain the best results in an economical manner, the product of my present invention is manufactured as follows: The syrup or converted liquor produced, for example, by the acid hydrolysis of starch, in which the conversion is carried as far as practical, say to the production of dextrose to the extent of 90% of the converted liquor (based on dry substances) is first purified, preferably, by being passed through bone char filters and is then concentrated to a density of from 38 degrees to 45 degrees Baumé. The preferable density is 41 degrees Baumé, and as a matter of fact, the density should be as high as possible in view of the desirability of shortening the time of crystallization. However, if the density is too high, the liquor will become so viscoas as to be unworkable in the later stages of the process and may have too high a degree of supersaturation causing false grain. The tendency of the liquor to become viscous when concentrated is due to the presence of dextrine and other impurities. Therefore, the extent to which concentration can be carried in any particular case will depend upon the character of the sugar liquor, its purity, the extent to which conversion has been carried, and the nature of the unconverted or partially converted products therein. The preferable density of 41 degrees Baumé supposes a converted liquor of average character having a dextrose content of approximately 90%.

Concentration is brought about by heating in a vacuum pan of any ordinary construction.

From the vacuum pan the concentrated liquor is run into a crystallizer which consists, preferably of a water jacketed vessel having a rotary agitator therein. The purpose of the agitator is to keep the magma in slow motion during crystallization so that new mother liquor is constantly brought to the growing crystals and a uniform growth of crystals maintained throughout the magma. The liquor coming from the vacuum pan will be relatively hot. It may have a temperature of 140 degrees Fahrenheit or higher. It should be cooled in the crystallizer to a temperature of from 135 degrees to 110 degrees Fahrenheit and possibly somewhat lower depending upon its density. With a density of 41 degrees Baumé (this and other density being based upon a temperature of 100 degrees Fahrenheit as is customary in the art) the preferable temperature for crystallization is from 120 to 115 degrees Fahrenheit. With a higher or lower density the temperature should be proportionately higher or lower as the case may be. The liquor is preferably cooled down to the desired temperature by the circulation of cold water through the jacket of the crystallizer. The range of temperatures favorable for the production of anhydrous sugar is, strictly speaking, between 120 degrees and 135 degrees Fahrenheit. If the temperature is reduced below that range, hydrate crystals tend to form. However, with the liquid seed with crystals of the anhydrous type and after crystallization at a temperature within the anhydrous range has gotten well started, the temperature may be allowed to slide down into the hydrate range, as low in some cases as 95 degrees Fahrenheit, and this lowering of the temperature is desirable in order to obtain as high a yield as possible, since the lower the temperature the higher will be the yield. However, 110 degrees Fahrenheit is, under ordinary circumstances, about as low a temperature as practical. This reduction of the temperature into the hydrate range can be safely accompished toward the end of the crystallizing operation without risk of contamination of the anhydrous sugar with hydrate crystals because after the growth of the anhydrous crystals has gotten a good start throughout the entire batch, the dextrose will continue to crystallize in that form even if the temperature be low enough so as to be, in itself, favorable to the formation of hydrate rather than anhydrous crystals.

When the liquor is introduced into the crystallizer, it is seeded with crystals of the anhydrous type. The seeding of the liquor with crystals of the type of sugar to be manufactured, such crystals being conveniently taken from a batch just previously made, has an important bearing in the matter of obtaining uniformity of crystallization through the magma. By inducing the crystallization through seeding, instead of allowing the crystals to form spontaneously, the crystals will tend to be all of substantially the same size, whereas if crystallization takes place spontaneously the crystals will ordinarily vary quite considerably in size, since the seed crystals form numerous centers of growth, tending to give the process of crystallization uniformity. The agitation of the magma also tends to produce the uniformity of action throughout the entire body of liquor and hence a yield of separately formed crystals of the same size and of normal crystalline structure. If the magma is quiescent, on the contrary, crystallization will tend to take place first in certain regions, at the walls of the crystallizer particularly, with the result that in these regions the crystals will be larger than elsewhere and with the result also that the crystals will form in conglomerate masses or groups of interlaced and intergrown crystals.

After crystallization has taken place, the material is introduced into a centrifugal machine and the mother liquor or hydrol extracted. The remaining crystaline product will then ordinarily be washed with water.

By carrying out the process in the manner above described so that (1) the converted liquor is concentrated to the proper density, (2) the concentrated liquor is seeded with pure anhydrous crystals, (3) is cooled to a temperature within the anhydrous range and corresponding to the density of the liquor, and (4) is kept in motion and at relatively the same temperature, during the crystallization period—with a possible reduction of temperature toward the end of the crystallization period—an anhydrous dextrose can be produced from a converted starch liquor or syrup which will consist of naturally formed crystals of the anhydrous type, and which will be pure white and without the bitter taste characteristic of corn sugars as heretofore manufactured. I have found it entirely possible in fact to manufacture a grape sugar which will contain less than one per cent of impurities. In fact by careful manipulation of the process the impurities can be reduced to less than one half of one per cent. The whiteness of the product and its freedom from bitter taste is the result of elimination of practically all the impurities found in the converted liquor. These impurities consist of unconverted dextrines, hydrolized protein matter and certain mineral substances and if reduced in quantity to the extent indicated their effect on both color and taste is quite inappreciable.

It is realized that even with the fullest disclosure of the invention, perfectly satisfactory results are attainable only by the exercise of some discretion on the part of the operator so far as concerns the density of the liquor in which crystallization is induced and the temperatures at which crystallization takes place. The character of the converted liquor will differ in different plants and even when much care is exercised with different batches in the same plant. The aim should be to concentrate the liquor as highly as possible but the degree of workable concentration will depend upon the character of the particular batch. It will be apparent from the foregoing that while I have described what I consider the preferred method of manufacturing the product herein claimed I realize that this method may be modified in certain respects, so long as the controlling principles thereof are observed; and, in fact, that it will in many cases have to be modified according to the varying characteristics of the converted liquor treated. The product herein claimed is therefore not to be considered as limited to the particular method of manufacture which has been described as preferable for obtaining the desired result under the conditions specified. By the term "separate unitary crystals" I mean that the crystals are simple and separate homogeneous structures built up through the process of crystallization in distinction to the conglomerations or agglomerations of crystals formed from different nuclei. I do not intend, however, to exclude multiple crystal forms produced by twinning on one or more of the axes of the nucleus crystal. Nor do I mean to exclude the possibility of the crystals being in somewhat fragmentary condition, in the finished product, which may result from the agitation in the crystallizer or from pressure in the centrifugal machine or from later handling of the material. By crystals of "normal crystalline form" I mean crystals in the form of prisms of substantial thickness both ways in proportion to their length in distinction to the needle-like or flake-like crystals produced under abnormal saturation conditions and which I have referred to as false grain.

I claim:

1. Starch converted dextrose consisting of a mass of separate, unitary anhydrous dextrose crystals of normal crystalline form for the anhydride, substantially unmixed with deformed crystals of the needle-like or flake-like kind.

2. Starch converted dextrose having a purity of 99% or greater, consisting of a mass of separate, unitary anhydrous dextrose crystals of normal crystalline form for the anhydride, substantially unmixed with deformed crystals of the needle-like or flake-like kind.

3. A magma of crystallized dextrose in a starch converted mother liquor in which the crystals are separate, of normal crystalline form, and substantially unmixed with flake-like or needle-like crystals so that the magma is purgable by centrifuging.

4. A magma of crystallized dextrose in a starch converted mother liquor in which the crystals are of the anhydrous type, are separate, and are of normal crystalline form for this type and substantially unmixed with flake-like or needle-like crystals so that the magma is purgable by centrifuging.

WILLIAM B. NEWKIRK.